United States Patent Office 3,143,854
Patented Aug. 11, 1964

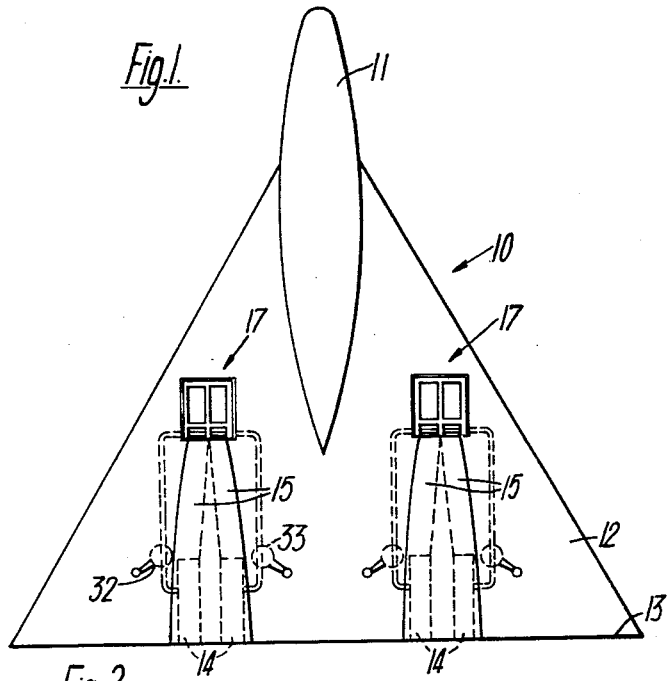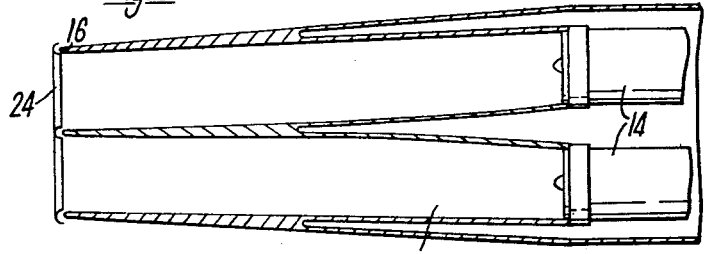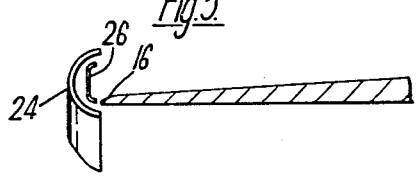

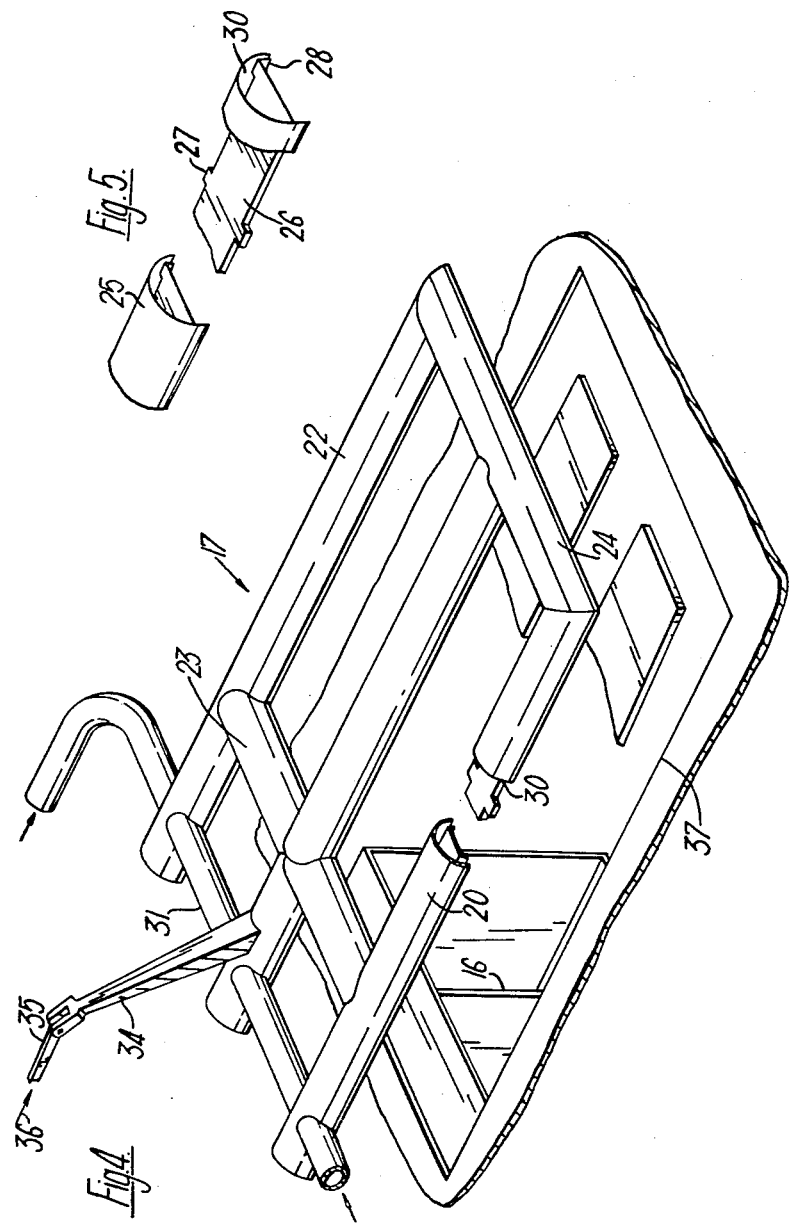

3,143,854
POWER PLANT INLET ADAPTED FOR USE ON A SUPERSONIC AIRCRAFT
Peter Arthur Ward, Littleover, Derby, England, assignor to Rolls-Royce Limited, Derby, England
Filed Jan. 9, 1962, Ser. No. 165,183
Claims priority, application Great Britain Jan. 10, 1961
9 Claims. (Cl. 60—35.6)

This invention concerns power plant adapted for use on a supersonic aircraft.

According to the present invention, there is provided a power plant adapted for use on a supersonic aircraft and comprising a jet propulsion engine, an air intake passage the walls of which have a sharp lipped forward edge, and a structure coinciding in outline to the passage edge and which is movable into and out of an operative position in which it overlies only the sharp lipped forward edge, the structure being so formed that, when in the operative position, it provides the air intake passage with a forward edge which does not have a sharp lipped shape.

The invention enables the power plant to be used both at supersonic speed, in which case the said structure should be disposed out of the operative position, and at subsonic speed, in which case the said structure should be disposed in the operative position.

Preferably, in the operative position, the structure provides the air intake passage with a rounded forward edge. The sharp lipped forward edge itself is preferably rectangular.

The structure is preferably provided with means for preventing icing thereof. Thus the structure preferably comprises a hollow fluid conducting framework composed of trough-like members with rounded edges, and there are means for supplying said framework with hot gas from the engine.

Preferably the engine is a gas turbine engine and there are means for supplying the said framework with part of the air which has been heated by being compressed in the engine compressor.

The arrangement is preferably such that, when the framework is in the operative position, hot gas may escape therefrom so as to heat the air intake passage. Thus the framework may comprise U-section elongated members in each of which is mounted an elongated substantially planar member at least part of whose opposite longitudinal edges are spaced from the respective U-section member.

The invention also comprises a supersonic aircraft provided with a power plant as set forth above.

Preferably the aircraft is provided with at least one pair of jet propulsion engines whose air intake passages are arranged adjacent to each other, a common structure being provided which is movable into and out of an operative position in which its members individually overlie the sharp lipped forward edges of the two adjacent air intake passages and provide both the air intake passages with rounded forward edges. The invention could, of course, also be applied to the intake of a single engine or of a bank of three or more engines for example.

The said structure is preferably mounted on the aircraft so that it may be moved upwardly into the operative position.

The invention is illustrated, merely by way of example, in the accompanying drawings, in which:

FIGURE 1 is a plan view of an aircraft provided with power plant according to the present invention, FIGURE 2 is a broken away sectional plan view of part of the power plant shown in FIGURE 1, FIGURE 3 shows, on a larger scale, a portion of the structure shown in FIGURE 2, FIGURE 4 is a broken away perspective view of another part of the power plant shown in FIGURE 1, and FIGURE 5 is a perspective view illustrating on a larger scale a part of the structure shown in FIGURE 4.

Referring to the drawings, an aircraft 10 has a fuselage 11 and a delta shaped wing 12.

Mounted adjacent to the trailing edge 13 of the wing 12 are two pair of forward propulsion, jet reaction, gas turbine engines 14. The engines 14 of each pair are disposed close to and parallel to each other.

Each engine 14 has an air intake passage 15, the passages 15 of adjacent engines 14 converging towards each other in a forward direction. Each passage 15 has a sharp lipped rectangular forward edge 16.

Two tubular frameworks 17 are provided, each of which, when in the inoperative position shown in FIGURES 1 and 4, is disposed in a recess (not shown) in the wing 12 and extends forwardly of and beneath the respective adjacent pair of air intake passages 15.

Each framework 17 (see FIGURE 4) comprises substantially tubular elements 20, 21, 22 which are parallel to each other and extend longitudinally of the framework 17. Each framework 17 also comprises substantially tubular elements 23, 24 which are parallel to each other and extend transversely of the framework 17, the interiors of the elements 23, 24 communicating with those of the elements 20, 21, 22.

Each of the substantially tubular elements 20–24 comprises a U-section elongated member 25 (FIGURE 5) in which is mounted an elongated substantially planar member 26. The opposite longitudinal edges of each substantially planar member 26 are provided with lugs 27, 28 which engage the respective U-section member 25, the members 26 being recessed between adjacent lugs 27, 28 so that there are gaps 30 between the members 25, 26.

Each framework 17 also includes a tube 31 which provides the framework 17 with a pivot axis about which it may be rotated. The interior of the tube 31 of each framework 17 communicates with the interiors of the elements 20, 21, 22 thereof and is arranged to receive air which has been heated by being compressed in the compressors (not shown) of the respective pair of engines 14. Hot air flow through each of tubes 28 is controlled by cocks 32, 33 (FIG. 1).

Mounted on the element 21 of each framework 17, at a point spaced from the tube 31 thereof, is a bracket 34 to which is pivotally connected a push rod 35. If the push rod 35 is pushed (by means not shown) in the direction of the arrow 36, the structure 17 will pivot about the axis of the tube 31. This will cause it to move from the inoperatvie position shown in FIGURE 4 and to pass through a rectangular opening 37 in the wing 12 until the structure 17 reaches an operative position (indicated in FIGURE 2) in which it overlies the forward edges 16 of the two adjacent air intake passages 15.

In the said operative position, the elements 20, 21, 22 overlie the vertically extending parts of the forward edges 16 and the elements 23, 24 overlie the horizontally extending parts of the forward edges 16.

When the aircraft 10 is travelling at supersonic speed, the frameworks 17 are disposed in the inoperative position shown in FIGURE 4 and the cocks 32, 33 are maintained closed. At supersonic speed the air intake passages 15 are therefore provided with sharp lipped forward edges and are not positively de-iced since such positive de-icing is unnecessary in these conditions.

When, however, the aircraft 10 is travelling at subsonic speed, in conditions likely to cause icing, the frameworks 17 are moved by the push-rods 35 through the openings 37 and into the operative position shown in FIGURE 2.

The cocks 32, 33 are then opened, whereby hot air is supplied to the elements 20–24. The hot air prevents the deposition of ice on the elements 20–24 and also escapes through the gaps 30 therein so as to heat the forward edges 16 and the upstream portions of the air intake passage 15. At the same time, the frameworks 17, when in the operative position, provide the adjacent air intake passages 15 with rounded forward edges.

I claim:

1. Power plant adapted for use on a supersonic aircraft and comprising a jet propulsion engine, an air intake passage therefor having a sharp lipped forward edge, and a unitary structure of trough-like elements which is movable into an operative situation in which each element overlies the correspondingly positioned sharp lipped forward edge, the structure elements being so shaped that when in the operative position they provide the air intake passage with a rounded forward edge, and means to move said structure entirely away from said passage.

2. Power plant adapted for use on a supersonic aircraft and comprising a jet propulsion engine, an air intake passage therefor having a sharp lipped forward edge, a fluid conducting framework coinciding in outline to said edge and which is movable into an operative position in which it overlies the sharp lipped forward edge and movable out of said operative position, means for moving said framework into and out of said operative positions, the framework when in the operative position, providing the air intake passage with a rounded forward edge, and means for supplying said framework with hot gas from the engine.

3. Power plant adapted for use on a supersonic aircraft and comprising a gas turbine engine having a compressor, an air intake passage for said engine having a sharp lipped forward edge, a fluid conducting tubular framework which is movable into an operative position in which its members overlie the sharp lipped forward edge and movable out of said operative position, means for moving said framework into and out of said operative position, the framework, when in the operative position, providing the air intake passage with a rounded forward entrance edge for air, and means for supplying the said framework with part of the air which has been heated by being compressed in the engine compressor.

4. Power plant adapted for use on a supersonic aircraft and comprising a gas turbine engine having a compressor, an air intake passage for said engine having a sharp lipped forward edge, a substantially tubular framework which is movable into an operative position in which it overlies the sharp lipped forward edge and movable out of said operative position, means for moving said framework into and out of said operative position, the framework, when in the operative position, providing the air intake passage with a rounded forward edge, and means for supplying the said framework with part of the air which has been heated by being compressed in the engine compressor, the framework, when in the operative position, permitting hot gas to escape therefrom so as to heat the air intake passage.

5. Power plant adapted for use on a supersonic aircraft and comprising a gas turbine engine having a compressor, an air intake passage for said engine having a sharp lipped forward edge, a substantially tubular framework which is movable into an operative position in which it overlies the sharp lipped forward edge and movable out of said operative position, means for moving said framework into and out of said operative position, the framework, when in the operative position, providing the air intake passage with a rounded forward edge, said framework comprising U-section elongated members and an elongated substantially planar member mounted in each U-section member, at least part of the opposite longitudinal edges of each planar member being spaced from the respective U-section member and means for supplying the said framework with part of the air which has been heated by being compressed in the engine compressor, the framework, when in the operative position, permitting hot gas to escape therefrom so as to heat the air intake passage.

6. Power plant adapted for use on a supersonic aircraft and comprising a gas turbine engine having a compressor, an air intake passage for said engine having a sharp lipped rectangular forward edge, a substantially tubular framework which is movable into an operative position in which it overlies the sharp lipped forward edge and movable out of said operative position, means for moving said framework into and out of said operative position, the framework, when in the operative position, providing the air intake passage with a rounded forward edge, said framework comprising U-section elongated members and an elongated substantially planar member mounted in each U-section member, means spacing at least part of the opposite longitudinal edges of each planar member from the respective U-section member and means for supplying the said framework with part of the air which has been heated by being compressed in the engine compressor, the framework, when in the operative position thereby directing hot gas therefrom so as to heat the air intake passage.

7. In a supersonic aircraft, power plant comprising a gas turbine engine having a compressor, an air intake passage for said engine having a sharp lipped forward edge, a substantially tubular framework which is movable into an operative position in which it overlies the sharp lipped forward edge and movable out of said operative position, means for moving said framework into and wholly out of said operative positions, the framework, when in the operative position, providing the air intake passage with a rounded forward edge, said framework comprising U-section elongated members and an elongated substantially planar member mounted in each U-section member, means spacing at least part of the opposite longitudinal edges of each planar member from the respective U-section member and means for supplying the said framework between said members with part of the air which has been heated by being compressed in the engine compressor, the framework, when in the operative position thereby directing hot gas therefrom so as to heat the air intake passage.

8. An aircraft as claimed in claim 7 comprising at least one pair of gas turbine engines whose air intake passages are arranged adjacent to each other, a common structure being provided which is movable into an operative position in which it overlies the sharp lipped forward edges of the two adjacent air intake passages and provides both the air intake passages with rounded forward edges and movable entirely out of operative position, and means being provided for moving said framework into and out of operative position.

9. An aircraft as claimed in claim 8 in which the said structure is mounted on the aircraft so that it may be moved upwardly into the operative position.

References Cited in the file of this patent

UNITED STATES PATENTS

| 2,647,366 | McCann | Aug. 4, 1953 |
| 2,738,029 | Battle | Mar. 13, 1956 |
| 2,780,913 | Nicks | Feb. 12, 1957 |
| 2,960,281 | Jumelle et al. | Nov. 15, 1960 |
| 2,970,794 | Johnson | Feb. 7, 1961 |

FOREIGN PATENTS

| 476,604 | Canada | Aug. 28, 1951 |
| 619,390 | Great Britain | Mar. 8, 1949 |